(12) United States Patent
Mattern et al.

(10) Patent No.: US 9,827,676 B2
(45) Date of Patent: Nov. 28, 2017

(54) ROBOT MODULE

(71) Applicant: Liebherr-Verzahntechnik GmbH, Kempten/Allgaeu (DE)

(72) Inventors: Thomas Mattern, Rieden (DE); David Haenschke, Altusried (DE); Berhard Riedmiller, Wertach (DE)

(73) Assignee: Liebherr-Verzahntechnik GmbH, Kempten/Allgaeu (DE)

( * ) Notice: Subject to any disclaimer, the term of this patent is extended or adjusted under 35 U.S.C. 154(b) by 160 days.

(21) Appl. No.: 14/728,526

(22) Filed: Jun. 2, 2015

(65) Prior Publication Data

US 2015/0343638 A1     Dec. 3, 2015

(30) Foreign Application Priority Data

Jun. 2, 2014    (DE) ........................ 10 2014 008 107

(51) Int. Cl.
| | | |
|---|---|---|
| *G06F 19/00* | (2011.01) | |
| *B25J 9/16* | (2006.01) | |
| *B25J 3/00* | (2006.01) | |
| *B25J 9/00* | (2006.01) | |
| *B25J 9/08* | (2006.01) | |
| *B25J 21/00* | (2006.01) | |

(52) U.S. Cl.
CPC .............. *B25J 9/1679* (2013.01); *B25J 3/00* (2013.01); *B25J 9/0084* (2013.01); *B25J 9/0093* (2013.01); *B25J 9/0096* (2013.01); *B25J 9/08* (2013.01); *B25J 21/00* (2013.01); *Y10S 901/31* (2013.01)

(58) Field of Classification Search
CPC ..... B25J 9/16; B25J 9/08; B25J 9/0096; B25J 9/0093; B25J 9/0084; B25J 9/1679; B25J 21/00; B25J 3/00; Y10S 901/31; B23Q 3/15553; B23Q 3/15513
See application file for complete search history.

(56) References Cited

U.S. PATENT DOCUMENTS

| | | | |
|---|---|---|---|
| 2006/0108342 A1* | 5/2006 | Samodell ............... | B23K 9/323 219/125.1 |
| 2008/0040911 A1 | 2/2008 | De Koning | |
| 2009/0120920 A1 | 5/2009 | Gurney et al. | |
| 2011/0258847 A1 | 10/2011 | Meisho et al. | |
| 2014/0017048 A1* | 1/2014 | Mattern ................ | B25J 9/1612 414/567 |

FOREIGN PATENT DOCUMENTS

| | | |
|---|---|---|
| DE | 3413255 A1 | 10/1985 |
| DE | 3532305 A1 | 3/1987 |
| DE | 4212178 A1 | 10/1993 |
| DE | 19519524 A1 | 11/1996 |

(Continued)

OTHER PUBLICATIONS

English translation for reference DE102012005735A1.*

*Primary Examiner* — Rachid Bendidi
(74) *Attorney, Agent, or Firm* — McCoy Russell LLP

(57) ABSTRACT

The present disclosure shows a robot module having a cell frame and a robot, wherein the cell frame has a base plate at which the robot is mounted and has at least one cell wall connected to the base plate, and wherein the robot module is equipped with a control module for the robot. The present disclosure furthermore comprises a feed module which is connectable to the robot module.

17 Claims, 16 Drawing Sheets

(56) References Cited

FOREIGN PATENT DOCUMENTS

| | | | | |
|---|---|---|---|---|
| DE | 102008019102 | A1 | 10/2009 | |
| DE | 202010015780 | U1 | 3/2011 | |
| DE | 102009040951 | A1 | 6/2011 | |
| DE | 102012005735 | A1 * | 9/2013 | ......... B23Q 3/15513 |
| EP | 2111091 | A2 | 10/2009 | |
| EP | 2679352 | A1 | 1/2014 | |

\* cited by examiner

ROBOT MODULE

CROSS REFERENCE TO RELATED APPLICATION

This application claims priority to German Patent Application No. 10 2014 008 107.9, entitled "Robot Module" filed on Jun. 2, 2014, the entire contents of which is hereby incorporated by reference in its entirety for all purposes.

TECHNICAL FIELD

The present disclosure relates to a robot module. The robot module in accordance with the present disclosure can in this respect in particular be used as a handling module, in particular for the removal of workpieces arranged in a container. The robot module can, however, also be used for other purposes.

BACKGROUND AND SUMMARY

Robots are used in the field of handling, machining and/or assembly of workpieces in a variety of fields and applications.

In this respect, the design and composition of individual units of a handling, machining and/or assembly system typically takes place individually and in dependence on the specific demands. In this respect, cell walls are furthermore typically provided in addition to the robot and to further units which serve the provision, the handling, the machining, the assembly and/or the transporting away of the workpieces. They prevent unauthorized access into the working zone of the robot or of the remaining components. The latter are also typically designed and assembled separately and respectively individually for the individual use.

It is the object of the present disclosure to simplify the planning, construction and provision of units in which robots are used.

This object is achieved in accordance with the present disclosure by various embodiments disclosed herein.

In this respect, the present disclosure shows, in one example, a robot module having a cell frame and a robot, wherein the cell frame has a base plate at which the robot is mounted and has at least one cell wall connected to the base plate, and wherein the robot module is equipped with a control module for the robot.

The robot module in accordance with the present disclosure thus provides a component which can be used in a plurality of applications without the interaction of robot module, cell frame and control module having to be constructed and manufactured again every time. The robot module can thus be produced in fairly large volumes and an in each case be adapted to the respective purpose by combination with other modules. Substantial advantages hereby result in the speed and in the costs of the construction, the manufacture and the final assembly.

The robot module is in this respect advantageously equipped such that it only has to be connected to other modules at the assembly location. In this respect, assembly work optionally no longer has to be carried out at the robot module itself. The robot can thus in particular already be completely wired to the control. The assembly times on site are hereby considerably reduced. The robot module may then be pre-assembled in a "hook-ready" manner.

The robot module is in this respect further optionally transportable as a whole. A fork lift can be used in this respect, for example, which travels beneath the base plate and transports the robot module as a whole. Alternatively or additionally, the robot module can also be transported in a hanging manner.

The robot of the robot module in accordance with the present disclosure may have a working zone which is larger than the base area of the base plate. The robot can in this respect in particular handle, in particular grip and/or machine, workpieces, which are arranged outside the robot module, via at least one free side of the cell frame.

The working zone of the robot is in this respect optionally so large that it extends at two sides of the cell frame beyond the base area thereof. The robot module can in this respect in particular be configured such that a gripper of the robot module can remove workpieces from a region which is arranged outside a first open side of the cell frame and can place them down in a second region which is arranged outside a second open side of the cell frame.

The cell frame is optionally open toward the top.

The cell frame of the robot module in accordance with the present disclosure advantageously has mechanical connection points for connection to further modules. A simple mechanical connection can hereby be established between the individual modules at the installation site. The mechanical connection points can, for example, be pins and/or pin mounts, and/or screws and/or screw domes, via which a mechanical connection takes place between a plurality of modules.

The robot module in accordance with the present disclosure can furthermore have an electrical supply, a pneumatic supply and/or a hydraulic supply. A compressed air generator and/or a hydraulic high-pressure supply can in particular be provided and/or an electrical supply which is connected to the mains and which supplies the components of the robot module with electrical energy.

The robot module can further optionally have an electrical interface, a pneumatic interface and/or a hydraulic interface for connection to further modules. The further modules can optionally access the electrical supply, the pneumatic supply and/or the hydraulic supply of the robot module through the interface. The further modules hereby do not require any separate supply, which reduces the costs and simplifies the assembly.

The robot module can furthermore have an interface which allows a coordination of the operation of the robot module with other modules. It is in this respect in particular an interface of the control module for the robot. The interface in this respect in particular allows a data exchange and/or the transmission and/or reception of control commands and/or of sensor data. The robot module can furthermore have an interface for a production control system which allows a coordination of the operation with a further production system.

The base plate of the cell frame optionally has a rectangular shape. The combination with the base plates of further modules is hereby simplified. The base plate in this respect optionally has a longer side and a shorter side.

Provision can furthermore be made that the cell frame has at least two cell walls. The cell walls are in this respect optionally connected to the base plate. The cell walls in this respect, with a completed plant set up of the robot module and other modules, provide that unauthorized persons do not have any access to the working zone of the robot module. The cell frame in this respect optionally has cell walls at two sides, while it is open at two sides. The robot module can in this respect optionally be connected to further modules at the sides at which no cell walls are provided. The cell frame can optionally also have cell walls at three sides and can be open only at one side. In this case, the robot module is connected to one or more modules at only one side.

In a possible embodiment of the present disclosure, the two cell walls are in this respect arranged at oppositely disposed sides of the base plate. The two cell walls in this respect are particularly optionally arranged at oppositely disposed narrow sides of the base plate. The longer sides of the base plate are hereby available for connection to further modules and thus a correspondingly wide region is available via which the robot of the robot module can cooperate with the components of the other modules.

In a second embodiment, the two cell walls can also be arranged at adjacent sides of the base plate. Further modules are optionally connected to the robot module diagonally in this case.

The cell frame of the robot module in accordance with the present disclosure can in this respect have vertically extending corner struts. The corner struts are in this respect optionally connected via horizontally extending cross-struts to form cell walls. A mechanically stable construction hereby results. The corner struts are in this respect advantageously connected to the base plate in their lower regions.

The corner struts optionally have mechanical connection points for connection to at least one further module. It can in this respect in particular be those mechanical connection points which were already presented in more detail above.

Provision can be made in accordance with the present disclosure that at least two of the side walls of the cell frame can be connected to one another in an upper region via a transport strut. The cell frame is hereby stiffened for the transport. The transport strut is then optionally removed again at the assembly site so that it does not restrict the working zone of the robot.

The robot module in accordance with the present disclosure optionally has an operating module. The operating module can in this respect in particular have an input/output interface. A display or a monitor can in this respect in particular be provided. Input elements such as a keyboard are further optionally provided for the input of data or control commands. The operating module is optionally arranged at an outer side of a cell wall and/or can also be equipped with a mobile operating element. The operating module optionally allows access to the control module.

The robot module in accordance with the present disclosure can furthermore have a switch cabinet. The electronic supply, pneumatic supply and/or hydraulic supply can in particular be provided in the switch cabinet. The switch cabinet is in this respect optionally accessible from an outer side of the cell wall. The operating module and the switch cabinet are in this respect optionally arranged in two different cell walls of the cell frame, in particular on oppositely disposed sides of the cell frame.

The robot module in accordance with the present disclosure is optionally a handling module, in particular for the handling of workpieces. The robot is optionally equipped or equippable with a gripper for this purpose. Alternatively or additionally, the control module can have a control routine for gripping and/or placing down workpieces via the robot.

In a possible embodiment, the robot module operates to perform a gripping of workpieces arranged in an unordered manner in a container. The control module of the robot module can in this respect in particular have an interface to an object recognition device for detecting the workpieces in the container. The control module can furthermore have control routines for evaluating the data of the object recognition device, for path planning and for controlling the gripper.

The robot module in accordance with the present disclosure can in this respect in particular be used in an apparatus for the removal of workpieces from a container such as is known from EP 2 679 352 A1.

A robot module in accordance with the present disclosure can furthermore have a buffer station which is arranged at the base plate of the robot module and on which workpieces which have been gripped by a gripper of the robot module are placed down and can be picked up again by this gripper or by another gripper.

The present disclosure furthermore comprises a buffer module on which a buffer station is arranged for placing down and picking back up a workpiece. The buffer module in this respect optionally has a cell frame and a buffer station. The buffer module can in this respect in particular have a base plate and at least two cell walls. The buffer station is in this respect optionally arranged at the base plate. The buffer module in this respect optionally has two open sides.

The present disclosure furthermore comprises a buffer station for placing down and picking back up a workpiece, said buffer station being able to be integrated in an output module, machining module and/or assembly module.

The present disclosure furthermore comprises a feed module having a cell frame and an arrangement for providing a container having workpieces. The feed module thus also allows a particularly simple design, manufacture and assembly of an apparatus for handling workpieces. The cell frame and the arrangement for providing a container having workpieces in particular here also no longer have to be designed and assembled separately. The same advantages thus substantially result from the feed module in accordance with the present disclosure which have already been presented in more detail above with respect to the robot module in accordance with the present disclosure.

The feed module in this respect in particular serves the feed of containers having workpieces from which a robot module in accordance with the present disclosure can remove workpieces. The feed module in accordance with the present disclosure and the robot module in accordance with the present disclosure are in this respect optionally connectable to one another.

The cell frame of the feed module in this respect optionally has mechanical connection points. The connection points in this respect in particular provides a connection to connection points of the robot module.

Further advantageously, the feed module in accordance with the present disclosure can have an electrical interface, a pneumatic interface and/or a hydraulic interface for connection to a corresponding interface of the robot module in accordance with the present disclosure. The feed module can in this respect in particular be supplied via the interface with electrical energy, pneumatic energy and/or hydraulic energy. The feed module hereby does not require any separate electrical supply, pneumatic supply and/or hydraulic supply in an example embodiment.

The feed module can furthermore have an interface which enables a coordination of the operation of the feed module with other modules. The interface in this respect in particular provides a connection to the control module of the robot module. Provision can in this respect be made in a possible embodiment that actuators arranged in the feed module are controlled via the control module of the robot module. Provision can furthermore be made that the control module receives data from sensors which are arranged in the feed module. In an alternative embodiment, however, the feed module can also have its own control module which controls actuators of the feed module and/or evaluates sensors of the feed module, with such a control module of the feed module optionally communicating via an interface with the control module of the robot module. The feed module can furthermore have an interface for the production control system which allows a coordination of the operation with a further production system.

The feed module in accordance with the present disclosure optionally has a cell frame with a base plate at which the arrangement for providing a container having workpieces is arranged. Provision can furthermore be made that the cell frame of the feed module has cell walls at at least two sides and optionally at three sides and is open at at least one side. The cell frame can in this respect in particular optionally be connected to the robot module via the open side. The connection between the robot module and the feed module in this respect optionally takes place in a manner such that a gripper of the robot module can grip into at least one container, which is provided by the arrangement for providing a container, and can remove workpieces from it.

Provision can be made in accordance with the present disclosure that at least two of the side walls of the cell frame can be connected to one another in an upper region via a transport strut. The cell frame is hereby stiffened for the transport. The transport strut is then optionally removed again at the assembly site so that it does not restrict the working zone of the robot.

The arrangement for providing a container having workpieces is in this respect optionally accessible from the outside at at least one side, in particular via a door arranged at at least one side and/or via an automatic feed and/or removal path arranged at at least one side. Full containers are optionally fed in and empty containers are removed again via this side. The side from which the arrangement for providing a container having workpieces is accessible from the outside optionally lies opposite the open side.

The feed and/or removal direction of the container feed and/or removal path can in this respect be arranged either in parallel with the open side or perpendicular thereto depending on the embodiment, with the transport direction of the container feed path in this case being in the opposite sense to the transport direction of the container removal path.

In an example embodiment of the present disclosure, the open side is optionally a broad side of the feed module. A broad side of the feed module is thus optionally open; the provision and removal of the containers take place at the oppositely disposed side and respective cell walls are provided at the narrow sides and separate the working zone of the robot.

In an example embodiment of the present disclosure, the arrangement for providing a container having workpieces can receive at least two containers. This allows a fast continued working after a first container has been emptied.

In a possible embodiment of the present disclosure, the feed module has a separating apparatus via which a feed zone for a container can be separated form a working zone of the gripper. Such a separating apparatus is in particular of advantage when the containers are fed in individually and removed again via a transport vehicle, for example. The separating apparatus in this case provides that the robot can still remove workpieces from a container located in the working zone of the robot, while a new container is fed in the feed zone or an emptied container is removed.

A hood can in this respect in particular be provided which is arranged in the feed module such that it can be moved selectively over the feed zone for the one or the other container. The hood can in this respect in particular be displaceable and/or pivotable.

In an alternative embodiment, the feed module can have a transport arrangement for the transporting of the containers in the interior of the feed module. This transport arrangement can in this respect in particular cooperate with an automatic container feed path and/or container removal path. The transport arrangement for transporting the containers in the interior of the fed module in this respect in particular allows a container emptied by the robot to be transported on and to be fed to the removal path. In a possible embodiment, a light barrier is provided in this respect which secures the feed zone.

The transport arrangement can in this respect in a possible embodiment be a transverse shuttle which displaces the containers in the interior of the feed module perpendicular to a feed direction or removal direction of the automatic feed and/or removal path. The containers are therefore supplied full at one side, are emptied in the interior of the feed module and are then displaced via the transverse shuttle to the inlet zone of the removal path from where they are again removed.

Alternatively, the transport arrangement of the feed module can be a rotary table on which the containers can be arranged, with the containers being travelable by rotating the rotary table from a feed zone of the feed module into a working zone of the gripper of the robot module and vice versa.

The feed module can furthermore cooperate with a driverless transport system.

The present disclosure furthermore comprises an output module, a machining module and/or an assembly module for connection to a robot module such as was presented above. The output module, machining module and/or assembly module in this respect in particular have an end placement area on which the workpieces are placed down in a separated manner and/or in a defined position by a gripper of the robot module. The module in this respect further advantageously has mechanical connection points for connecting to a robot module such as was presented above. An output module in this respect optionally has a transport path for the workpieces via which the workpieces can be transported away. A machining and/or assembly module optionally has a machining and/or assembly unit by which workpieces can be machined and/or assembled.

The output module, machining module and/or assembly module optionally has/have a cell frame which optionally has a base plate and/or one or more side walls.

Provision can be made in accordance with the present disclosure that at least two of the side walls of the cell frame can be connected to one another in an upper region via a transport strut. The cell frame is hereby stiffened for the transport. The transport strut is then optionally removed again at the assembly site so that it does not restrict the working zone of the robot.

The cell frame optionally has mechanical connection points. The connection points in this respect in particular provides a connection to connection points of the robot module.

The present disclosure furthermore comprises a handling plant for workpieces having a robot module and having at least one feed module and/or having at least one output module, machining module and/or assembly module, such as have been presented above.

The present disclosure will now be described in more detail with reference to embodiments and to drawings.

DETAILED DESCRIPTION

In a first aspect, the present disclosure relates to the modular structure of an apparatus for the automated removal of workpieces arranged in a container. Such apparatus have an object recognition device for detecting the workpieces present in the container and have a gripper for gripping and removing the workpieces from the container to place them down on an end placement area, optionally via one or more buffer stations. The apparatus furthermore has a control for evaluating the data of the object recognition device, for path planning and for a corresponding controlling of the gripper.

Such apparatus make it possible to separate unsorted bulk goods which are fed unordered in containers to a production unit or to a production and/or assembly line and thus to feed them to the further production.

Such apparatus in this respect typically require an adaptation to the requirements of the respective production unit or production and/or assembly line to satisfy the demands made by the different workpieces and/or by the feed and/or output of the workpieces. In this respect, the implementation previously had to be redesigned for each customer.

The present disclosure in contrast provides a modular structure for such an apparatus which provides an apparatus for the automated removal of workpieces arranged in a container without any complex and/or expensive individual constructions or at least with a reduction thereof, said apparatus optionally being able to be integrated into existing machining and/or production units.

Figure 1:
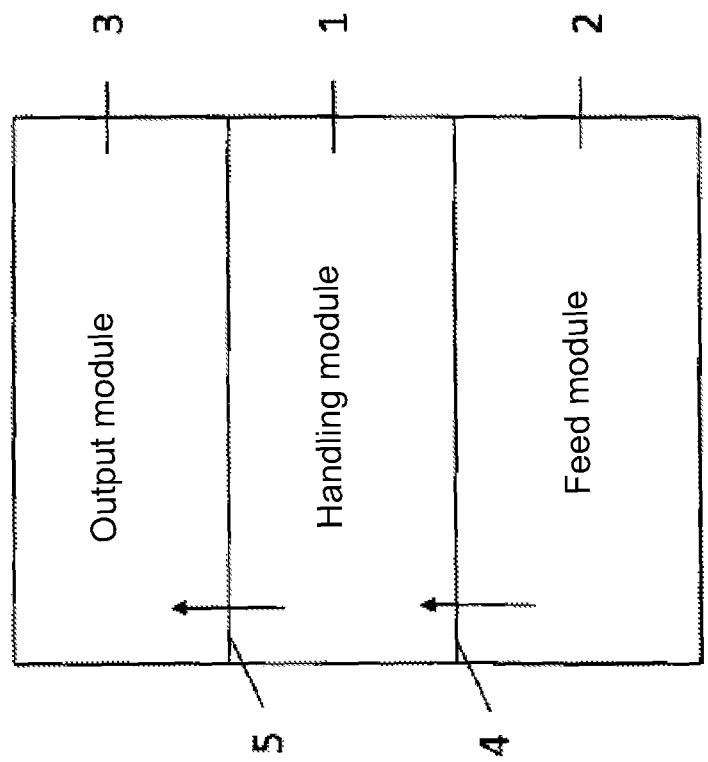
FIG. 1 shows a schematic representation of the modular construction in accordance with the present disclosure of an apparatus for the automated removal of workpieces arranged in a container and of a handling plant.

The modular construction in accordance with the present disclosure is shown schematically in FIG. 1 and divides an apparatus for the automated removal of workpieces arranged in a container into a central handling module 1 on which the gripper kinematics is arranged which is in particular a robot or an area gantry for moving the gripper. The handling module 1 is combined with a feed module 2 which has an arrangement for providing the containers having the workpieces. The arrangement of handling module 1 and feed module 2 is furthermore typically combined with an output module 3 on which the gripper of the handling module 1 places the workpieces down in a separated manner. The output module 3 in this respect typically has a transport path for transporting away the workpieces.

Respective interfaces 4 and 5 via which the individual modules are connected to one another are provided between the handling module 1, the feed module 2 and the output module 3. In this respect, it can be a mechanical interface. An electrical interface, a pneumatic interface and/or a hydraulic interface can furthermore also be provided. In addition, the interface can allow a coordination of the operation between the individual modules. In addition, an interface to a production system can be provided.

Figure 2A:
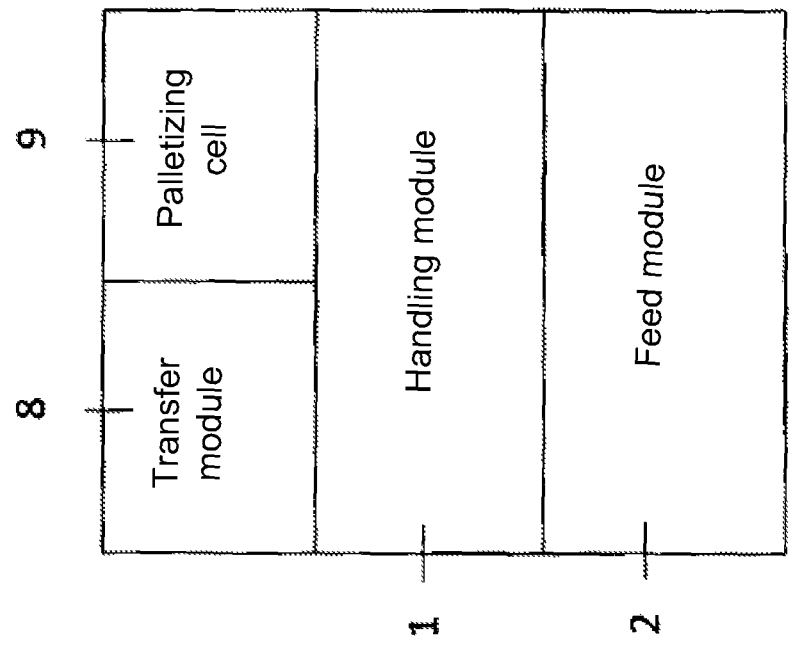
FIG. 2A shows a first variant of the modular construction in which an assembly module is additionally provided.
Figure 2B:
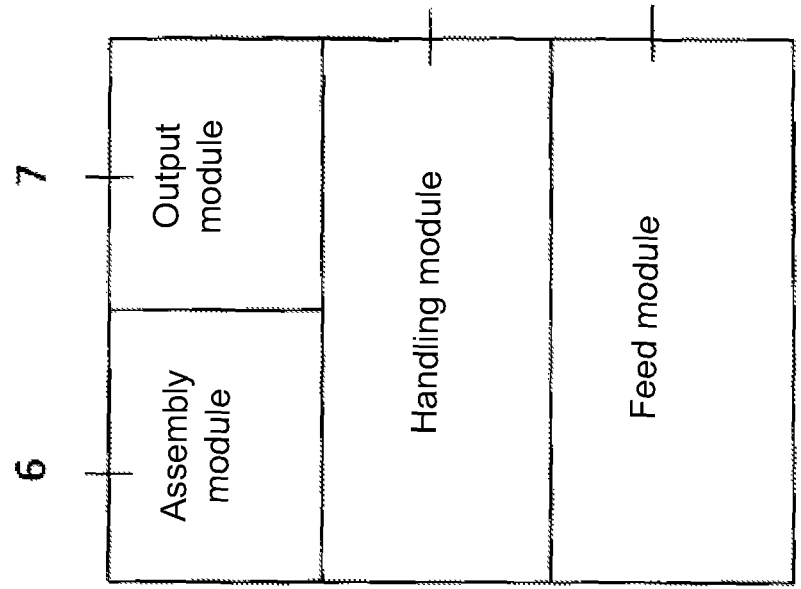
FIG. 2B shows a second variant in which the output module comprises a transfer module and a palletizing cell.

In this respect, two variants of the basic modular construction shown in FIG. 1 are shown in FIGS. 2A and 2B. An assembly module 6 is provided in FIG. 2A in addition to the handling module 1, the feed module 2 and the output module 7. Workpieces can, for example, be machined thereat and/or assembly steps can be carried out at the workpieces. The workpieces can in this respect first be given by the handling module to the assembly module and can be given from it back to the output module 7 via the handling module.

A variant is shown in FIG. 2B in which the handling module 1 is in communication with a palletizing cell 9 via a transfer module 8. The transfer module can, for example, be a transport belt on which palletizing baskets can be transported to the palletizing cell. The workpieces can then first be placed down into the palletizing baskets in the region of the transfer module 8. The palletizing baskets are then transported into the palletizing cell 9 for which a corresponding transport device is optionally provided.

The transfer module can either be joined to a palletizing cell or it can be integrated as a transfer module in a palletizing cell and can thus provide a direct input into the palletizing cell.

The handling module which can be combined with different feed modules in this respect serves as the base unit for all variants of the apparatus in accordance with the present disclosure. The unit of handling module and feed module can then be expanded by different kinds of a removal module or can be attached to existing transport units, machining and/or assembly units.

The modular structure makes it possible to meet the various, multi-variant demands of the customers with respect to production lines, machining lines and assembly lines without a respective complete new construction. The interfaces furthermore allow a simple and fast assembly on site since the individual modules are supplied preassembled and only have to be connected to one another at the assembly site.

In an embodiment of the present disclosure, the handling module 1 and the feed module 2 in particular each have a cell frame. The latter typically comprises a base plate as well as one or more cell walls which prevent unauthorized access to the working zone of the handling device with a set-up apparatus. The cell frames of the individual modules are in this respect connected to one another via mechanical connection points. Electrical interfaces, pneumatic interfaces and/or hydraulic interfaces can furthermore be provided for connecting the modules. The individual modules can in this respect in particular be delivered in a completely set-up manner and can then be connected to one another by a few manipulations.

The handling module 1 in this respect has the gripper kinematics in its basic equipment, i.e., an arrangement via which the gripper for removing the workpieces from the container and for placing them down on a buffer placement area or end placement area can be moved. A robot, in particular a six-axis robot, is in particular used for this purpose. Alternatively, however, an area gantry can also be used. The handling module furthermore has a corresponding control for the gripper kinematics and for the gripper. In the embodiment, the handling module furthermore has an operating module having a user interface via which the control can be accessed. An electrical supply, pneumatic supply and/or hydraulic supply can furthermore be provided, in particular in a switch cabinet. The user interface and the switch cabinet are optionally accessible from the outer sides of the cell walls.

The apparatus in accordance with the present disclosure for the removal of workpieces from the containers in this respect has an object detection device having a sensor. Said sensor is respectively arranged in the region of the feed module and can be arranged above a container to be emptied to detect the workpieces in the container. It is in this respect in particular a 3D laser scanner. The data of the sensor are in this respect evaluated to identify the individual workpieces and their positions and to determine a workpiece suitable for gripping. A track planning for the gripper or for its gripper kinematics, in particular for the robot 10, then takes place using the positional data of this workpiece. For this purpose, the sensor is in communication with the control of the handling module via an interface.

In the following, some variants will now be described how a handling module in accordance with the present disclosure can be combined with different feed modules and/or output modules.

Figure 3:
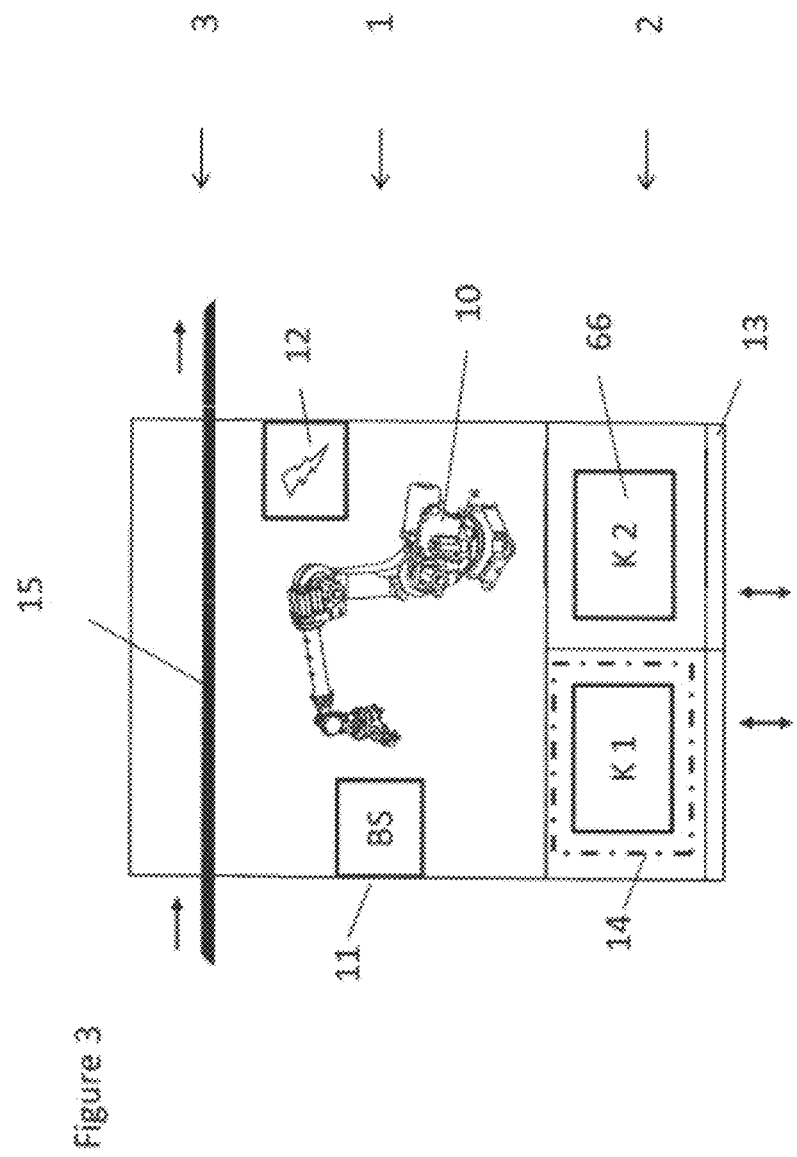
FIG. 3 shows a first embodiment of an apparatus in accordance with the present disclosure in which the containers can be traveled into the feed module via a transport vehicle.

In FIG. 3 in this respect, the handling module 1 is first shown which has a robot 10, the user interface 11 and the energy supply 12. The handling module 1 in this respect has two open sides via which it is in communication with a feed module 2 and with an output module 3.

In the embodiment shown in FIG. 3, the feed module 2 has two feed zones for containers which are arranged next to one another and which are each accessible from the outside via a door 13. The containers 66 can in this respect, for example, be introduced into or removed from the respective feed zone via a fork lift. To separate the feed zones for the containers from the working zone of the gripper, a hood 14 is provided which can selectively be pushed over the feed zone for the one or for the other container. If one of the two containers is thus completely emptied, the hood travels over it and thus releases the other container for the gripper. The gripper can thus seamlessly continue with the emptying. The now emptied container can now be removed without risk due to the hood 14 which covers the feed zone for said now emptied container and can be replaced by a full container.

In FIG. 3 a transport path 15 serves as the output module on which the workpieces removed from the containers can be placed down in a separated manner. The transport path can optionally have corresponding receivers for this purpose. It is a transport belt in the embodiment.

Figure 4:
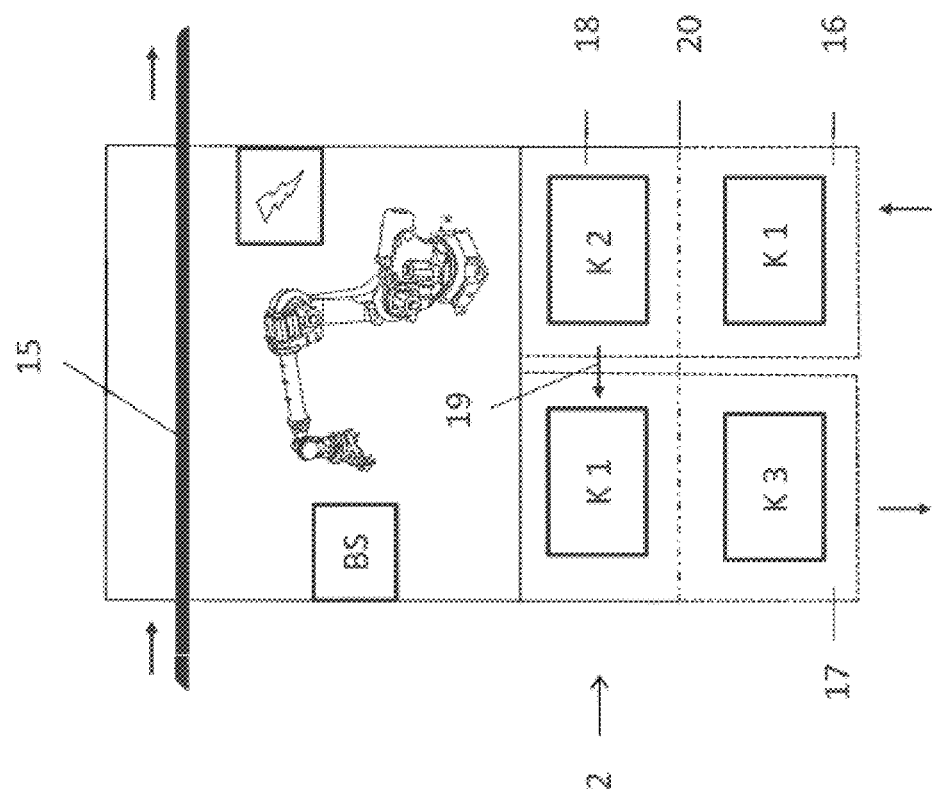
FIG. 4 shows a second embodiment in which the containers are fed in via an automated feed path and are removed via an automated removal path.

The embodiment shown in FIG. 4 differs from the embodiment shown in FIG. 3 by a differently designed feed module 2. The feed module is in this respect in communication with an automated container feed path 16 and with an automated container removal path 17 via which full containers can be fed and empty containers can be removed. The feed direction of the feed path 16 is in this respect opposite to the removal direction of the removal path 17.

A transverse shuttle 18 is therefore provided in the feed module 2 and containers can be traveled via it in the direction of movement 19 transverse to the feed direction or removal direction respectively. Containers are therefore transported from the feed path 16 into the feed zone of the feed module. The containers can be emptied there by the handling module. An emptied container is then traveled via the transverse shuttle 18 to a transfer zone for transferring to the removal path 17 from where the emptied containers are removed. Alternatively, a filled container can also first be transported via the transverse shutter within the feed arrangement and the removal of workpieces from the container can only then take place. In the embodiment, a light barrier 20 is in this respect furthermore provided which is arranged between the feed module and the feed path 16 and/or the removal path 17. The light barrier in this respect prevents the access of persons into the region of the feed module.

Figure 5:
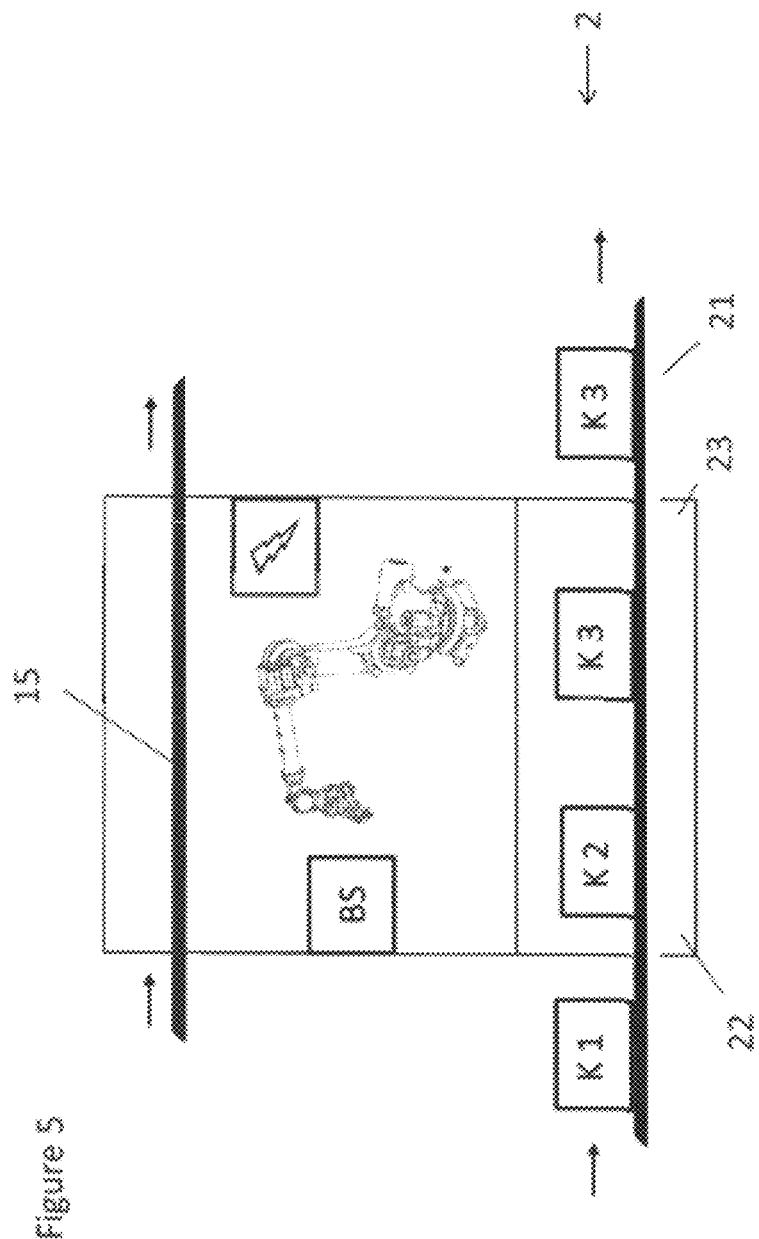
FIG. 5 shows a third embodiment in which a transport belt is used for feeding and removing the containers as well as a further transport belt for removing the workpieces.

In the embodiment shown in FIG. 5, a transport path 21 for the containers is provided as the feed module 2, in particular a transport belt, via which both the feed of full containers and the removal of emptied containers takes place. The feed and removal in this respect in particular take place without a change in direction simply by continued transport on the transport path. The feed module 2 in this respect optionally has openings on its narrow sides 22 and 23 through which openings the transport path with the containers passes.

Figure 6:
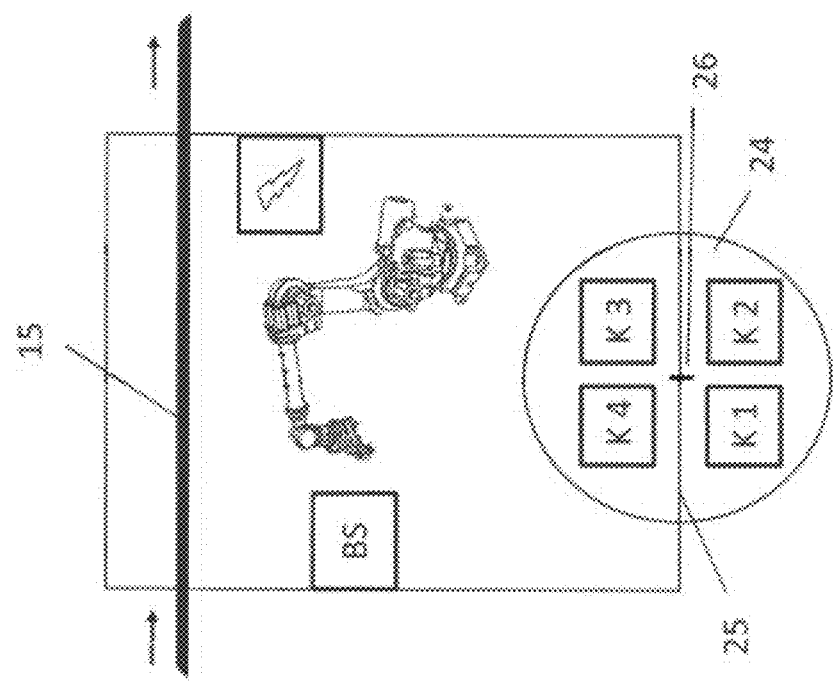
FIG. 6 shows a fourth embodiment in which the feed module has a rotary plate.

In the embodiment shown in FIG. 6, the feed arrangement has a rotary plate 24 on which a plurality of containers can be arranged. The rotary plate 24 is in this respect rotatable about a vertical axis of rotation 26 to bring the containers from a feed zone for the containers into the working zone of the handling module.

The rotary plate 24 in this respect optionally has a separating wall 25 which separates the working zone of the gripper from the feed zone for the containers. The feed and removal of the containers to and from the rotary plate can in this respect again take place via a transport vehicle, for example via a fork lift. Alternatively, such a rotary plate can also be automated with an automated feed path and/or removal path for the containers.

Figure 7:
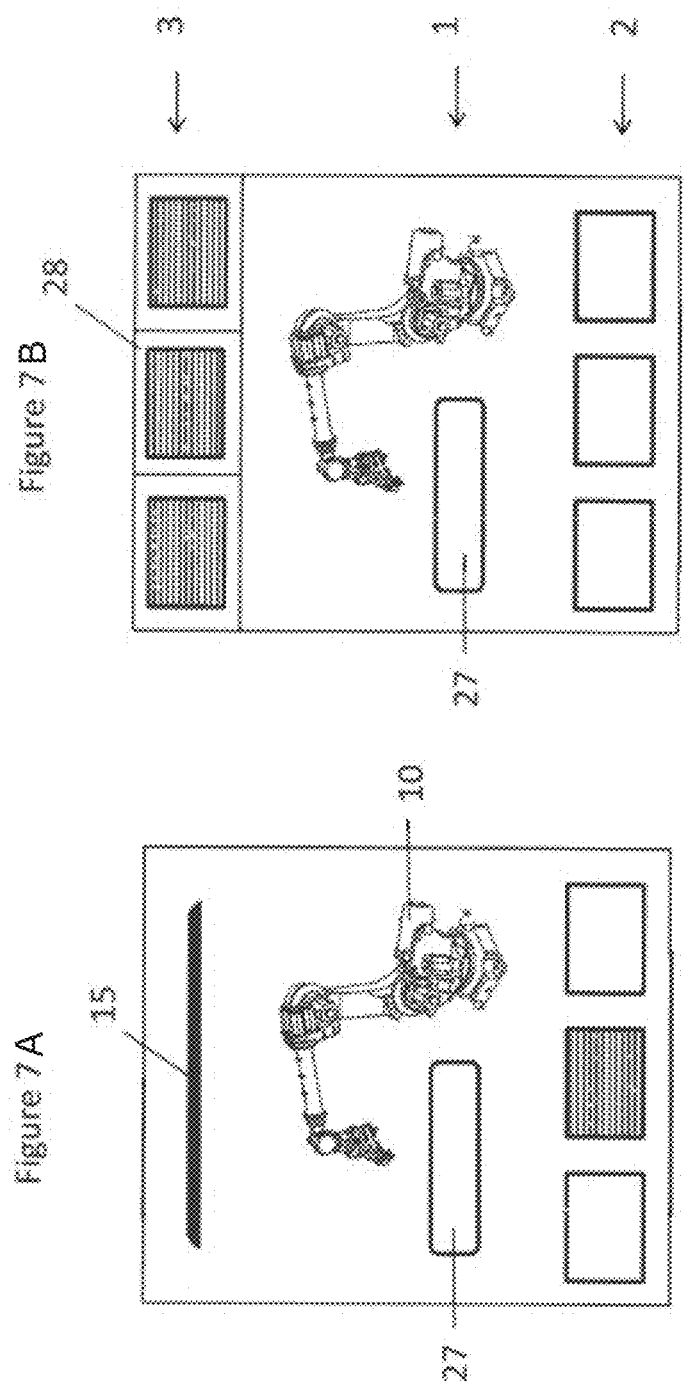
FIG. 7A shows a fifth embodiment in which a buffer station is provided.
FIG. 7B shows a sixth embodiment in which the output module is formed by a palletizing cell.

In the embodiment shown in FIGS. 7A and 7B, a buffer station 27 is furthermore provided in the zone of the handling module 1, on which buffer station the gripper of the handling module can place down, and optionally grip again, workpieces which have been removed from the containers in the region of the feed module. The buffer station in this respect in particular allows a more precise grip and thus a more precise laying down in the region of the output module. In this respect, any desired feed module can be used as the feed module 2 which is only shown schematically in FIGS. 7A and 7B. Any desired output module can furthermore also be used.

In this respect, a transport path 15 is again used as an output module in FIG. 7A. A palletizing cell 28 into which the workpieces can be placed is in contrast provided as the output module 3 in FIG. 7B.

Figure 8:
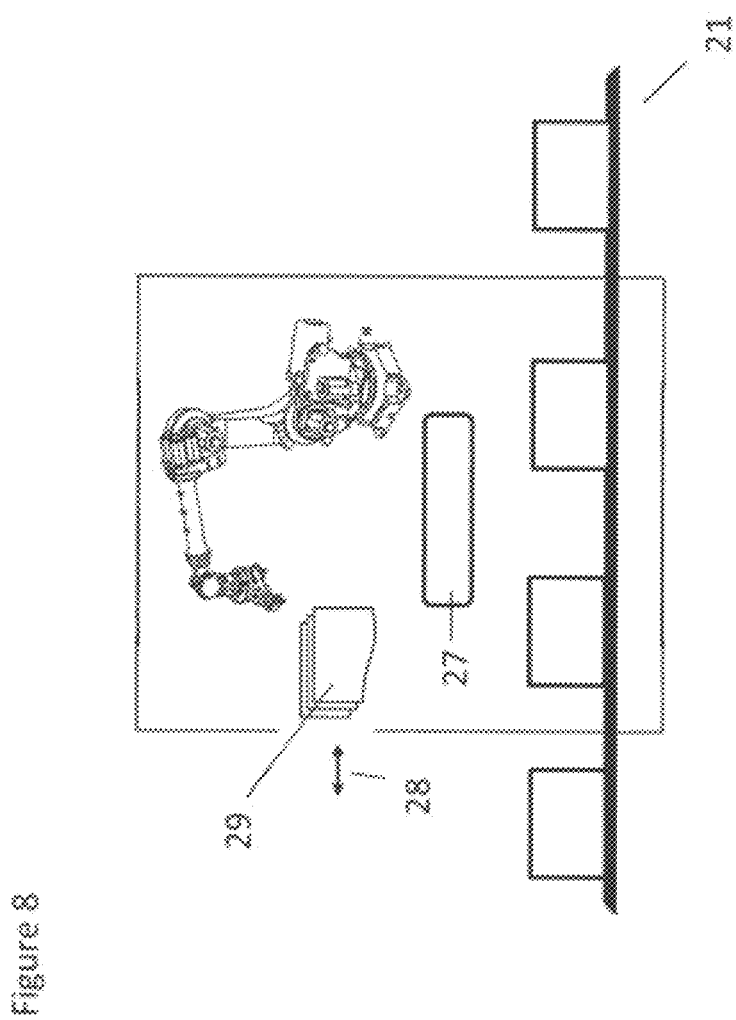
FIG. 8 shows a seventh embodiment in which the output module is in communication with a palletizing cell.

A further embodiment is shown in FIG. 8 in which the feed and removal of the containers take place via a transport belt 21. A buffer placement area 27 is furthermore provided here in the region of the handling module. The placing down in this respect takes place into palletizing baskets 29 which are traveled over a transport path 28 to a palletizing cell.

Figure 9:
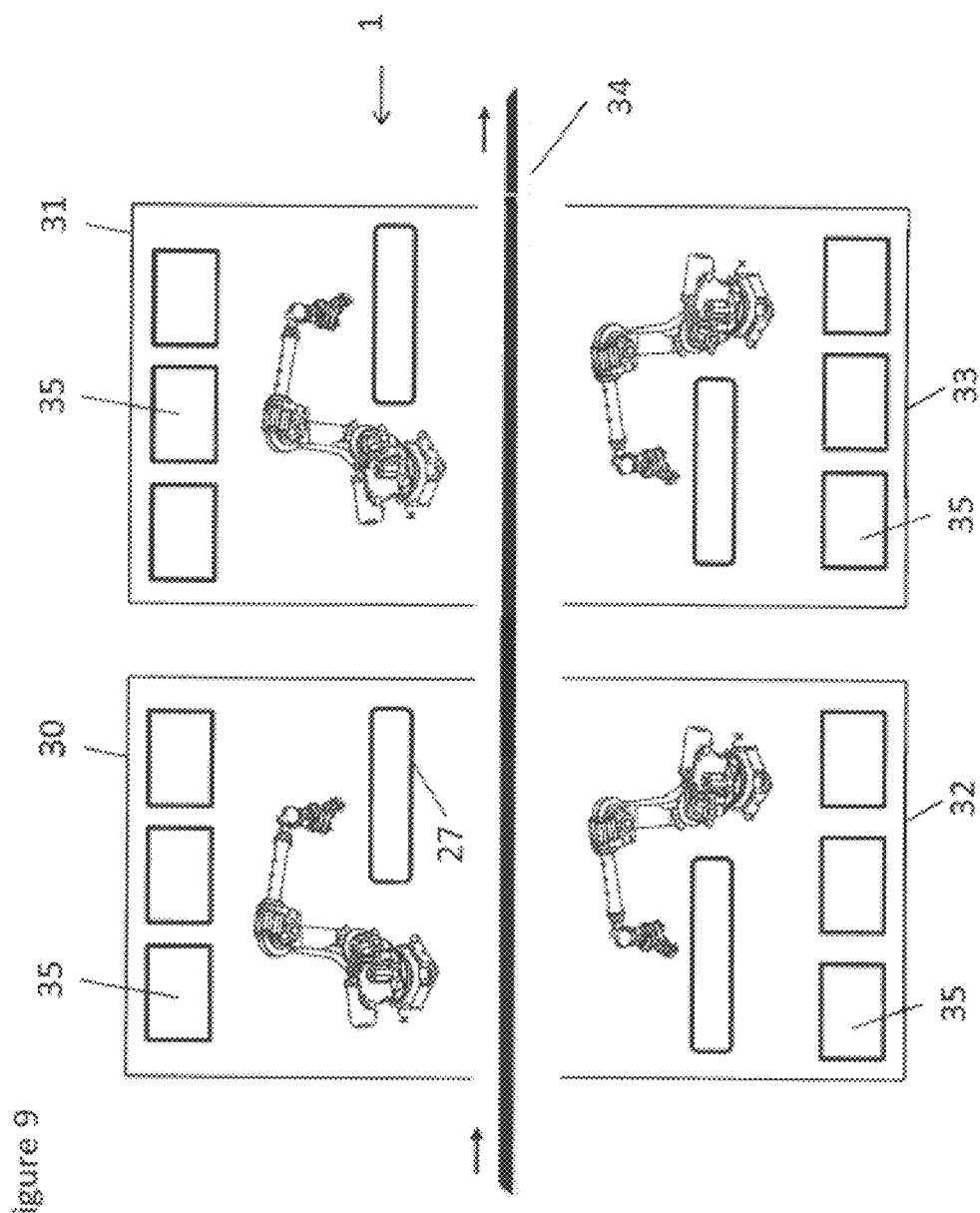
FIG. 9 shows an embodiment of an apparatus for the automatic removal of workpieces arranged in a container in which a plurality of handling modules place workpieces down in parallel on a common output module.

An arrangement is shown in FIG. 9 in which a plurality of handling modules 1 are combined with a single output module 34, in the embodiment again a transport belt. The handling modules in this respect work in parallel and place respective separated workpieces on the output module 34. In the embodiment, the individual handling modules 1 are in this respect each combined with separate feed modules 35 and thus form removal units 30 to 33. In this respect, a respective two removal units 30 and 32 are provided on oppositely disposed sides of the transport belt 34 in the embodiment so that the loading takes place from oppositely disposed sides. A respective two removal units are furthermore provided after one another along the transport belt 34.

Figure 10:
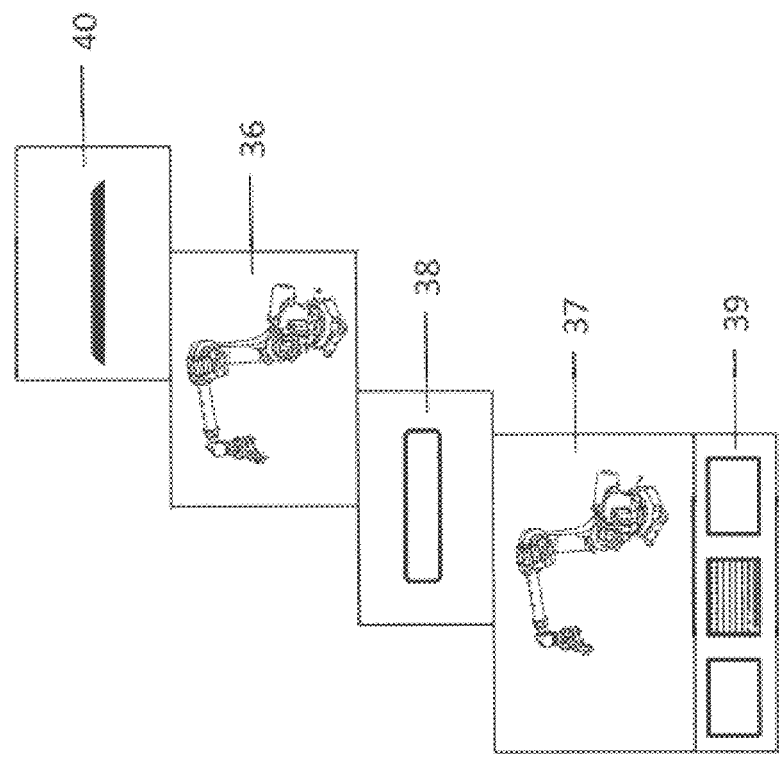
FIG. 10 shows a further embodiment in which a buffer module having a buffer station is interpose between two handling modules.

An embodiment is shown in FIG. 10 in which a plurality of handling modules are likewise used. They are in this respect, however, connected in series so that the workpieces are each handled after one another by two different handling modules. This in particular allows an increase in the gripping precision in the placing down on the end placement area. In the embodiment, the handling modules 36 and 37 are in this respect provided which are combined with a buffer station via a buffer module 38. The individual modules can in this respect, as shown schematically in FIG. 10, be combined in an offset manner, but optionally in an aligned manner. The arrangement of the two handling modules 36 and 37 and of the buffer module 38 is then combined with a feed module 39 and an output module 40. The first handling module 37 in this respect removes workpieces from the containers in the region of the feed module 39 and places them down on the buffer station of the buffer module 38 from where they are gripped again via the second handling module 36 and are placed down in the region of the output module 40.

In a further possible embodiment of the present disclosure, the feed module can cooperate with a driverless transport system.

Figure 11:
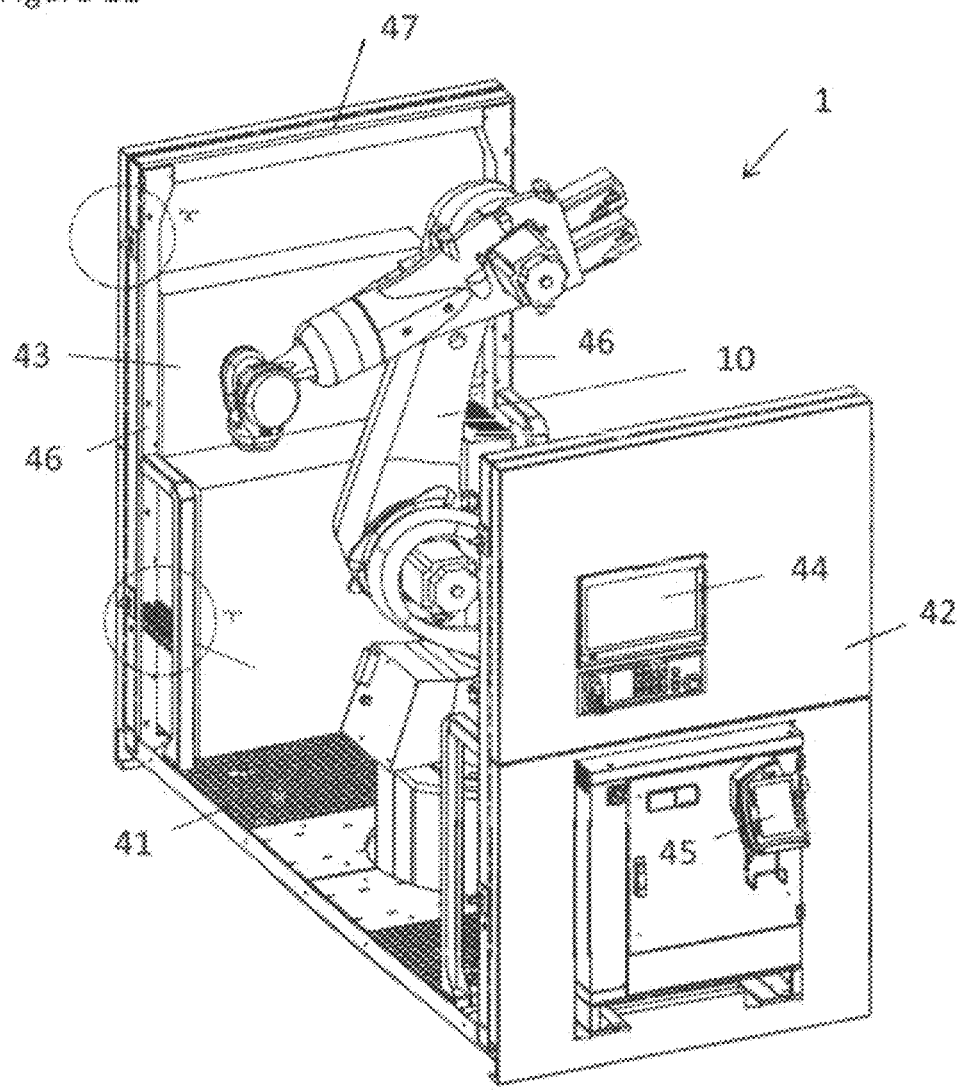
FIG. 11 shows an embodiment of a robot module in accordance with the present disclosure or of a handling module in accordance with the present disclosure.

An embodiment of a robot module in accordance with the present disclosure is shown in FIG. 11 which can, for example, be used as a handling module in an apparatus in accordance with the present disclosure for removing workpieces from a container such as has been presented above. The robot module can, however, also be used independently of this application in a variety of working areas.

The robot module 1 comprises a cell frame which comprises a base plate 41 and the cell walls 42 and 43. The robot 10 is in this respect mounted on the base plate. The robot 10 is a six-axis industrial robot in the embodiment.

The base plate 41 is in this respect rectangular, with the two cell walls 42 and 43 being arranged on oppositely disposed narrow sides of the base plate 41. The two longitudinal sides of the robot module are open in contrast. The working zone of the robot 10 extends beyond the zone of the robot module through the open sides into the adjacent zone. The robot module 1 can hereby be combined with further modules which provide or take up workpieces, for example, which are machined and/or handled by the robot.

The cell walls are in this respect made up of corner struts 46 in the embodiment which are connected to one another via transverse struts 47. The cells walls furthermore have a lining. The cell walls in this respect prevent the access to the working zone of the robot 10.

A control module for the robot is integrated into the robot module. The robot module furthermore has a user interface which is arranged at an outer wall of the cell wall 42 in the embodiment. The interface in this respect has a display 44 and input elements. A touchscreen 45 is furthermore provided as an input/output element. The control module can be accessed and in particular the movement of the robot controlled via the user interface.

The robot module furthermore has an electrical supply, pneumatic supply and/or hydraulic supply 12 which is accessible from the outside via a switch cabinet arranged in the region of the other cell wall 43. It is in this respect in particular an energy supply not just for the robot or the robot module, but rather also for further modules which can be connected via corresponding interfaces.

The robot module in accordance with the present disclosure can be connected to further modules to form a machining unit, assembly unit and/or handling unit. The further modules optionally also have a cell frame which can be mechanically connected to the cell frame of the robot module.

The cell frame of the robot module shown in the embodiment in this respect has mechanical connection points 48 for connection to further modules. They are provided at the corner struts 46. In the embodiment, these are screw domes 49 which can be pushed through corresponding openings in the cell frame of a further module and can be screwed thereto.

Further modules for the energy supply can furthermore be connected to the robot module. A pneumatic and/or hydraulic interface 50 is provided for this purpose via which a further module can be connected to the hydraulic and/or pneumatic supply of the robot module.

In this respect, if the robot module has a hydraulic supply, it optionally comprises a pump which provides high-pressure hydraulic fluid. If a pneumatic supply is provided, it optionally comprises a compressor which provides compressed air.

The electrical connection of a further module can furthermore also take place via the electrical supply of the robot module. An electrical interface is optionally also provided for this purpose.

An interface to the control module of the robot can furthermore be provided via which the operation of the robot module can be combined with the operation of other modules.

In a first embodiment, the further module can in this respect itself have a control which communicates, optionally communicates bidirectionally, with the control module of the robot module 1 via the interface.

In an alternative embodiment, the control of actuators of a further module can also take place via the control module of the robot module. Sensor data of sensors which are arranged in a further module can furthermore be evaluated via the control module of the robot module.

A combination of the above-named variants of an interface is furthermore also conceivable.

The robot module is built up so that it can be delivered to the installation site in a completely pre-assembled manner as a construction unit. In this respect, the cell frame can optionally be stiffened for transport via a longitudinal strut which connects the cell walls to one another in their upper regions. The transport of the robot module can in this respect take place either in a hanging manner, for example in that hooks are connected to the longitudinal strut or to the cell walls or in that the robot module is transported in a manner hanging at the robot. Alternatively, the robot module can, for example, be transported via a fork lift which grips beneath the base plate.

The robot module in this respect already has a complete wiring of the robot to the control module, to the energy supply and to the user interface. Only a few assembly steps thereby have to be carried out at the installation site.

The further modules are optionally also pre-assembled accordingly and only have to be mechanically connected to the robot module and connected via the corresponding interfaces to the energy supply and/or to the control module of the robot module.

Figure 13:
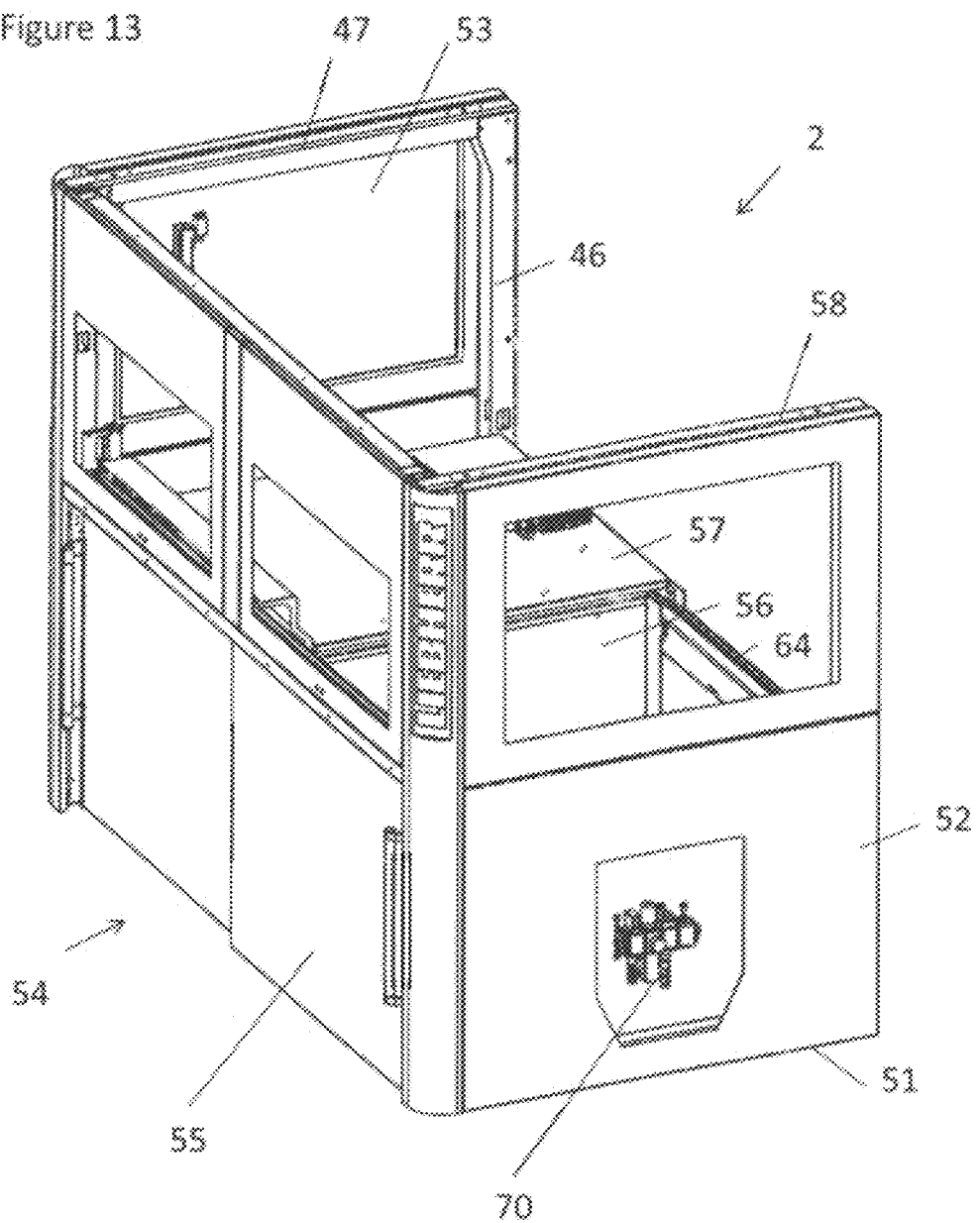
FIG. 13 shows an embodiment of a feed station in accordance with the present disclosure.

An embodiment of a feed module is shown in FIG. 13 which can be connected to the robot module 1 in accordance with the present disclosure which in this case works as a handling module. The feed module 2 and the robot module or handling module 1 in this respect optionally form an apparatus for the removal of workpieces arranged in a container, in particular for the removal of workpieces arranged in a container in an unordered manner.

The feed module 2 in this respect likewise has a cell frame which can be connected to the cell frame of the handling module 1. In this respect, the cell frame has a base plate 51 as well as cell walls 52, 53 and 54. One side of the feed module is open in contrast and is connected to an open side of the handling module so that the robot 10 can work in the region of the feed module.

The cell frame of the feed module in turn has corner struts 56 which are connected to one another via transverse struts 47 and longitudinal struts. Covers or windows are furthermore also provided here which protect the region of the feed module from unauthorized access.

Figure 12:
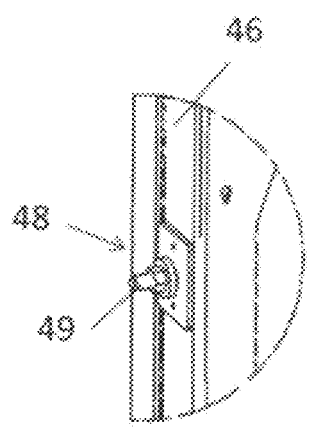
FIG. 12A shows a detailed view of the mechanical connection elements provided in FIG. 11.
FIG. 12B shows a detailed view of the pneumatic connection elements provided in FIG. 11.
Figure 12:
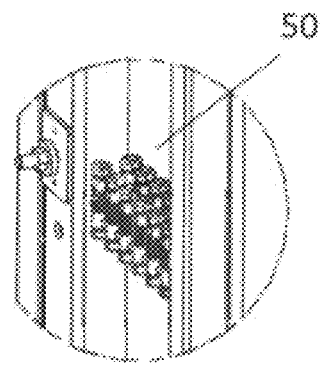

The corner struts 46 arranged at the open side of the cell frame can in this respect be mechanically connected to the corner struts 46 of the cell frame of the robot module, in particular via the fastening points shown in FIG. 12A.

The connection to the energy supply of the robot module takes place via the interface 50 which is shown in FIG. 12B and which is connected to a corresponding interface 70 of the feed module. The interface 70 of the feed module is in this respect arranged in the interior of the feed module and is accessible via a door in an outer wall. Sensors and/or actuators of the feed module can furthermore be connected to the control module of the robot module via an electronic interface, not shown.

The feed module 2 is likewise completely pre-assembled and has a complete wiring which only makes a connection to the interfaces of the robot module necessary. The feed module can in this respect, for example, be hung from a hook via the bores 48 and can be transported in a hanging manner. Alternatively, a transport via a fork lift is also conceivable here.

Figure 14:
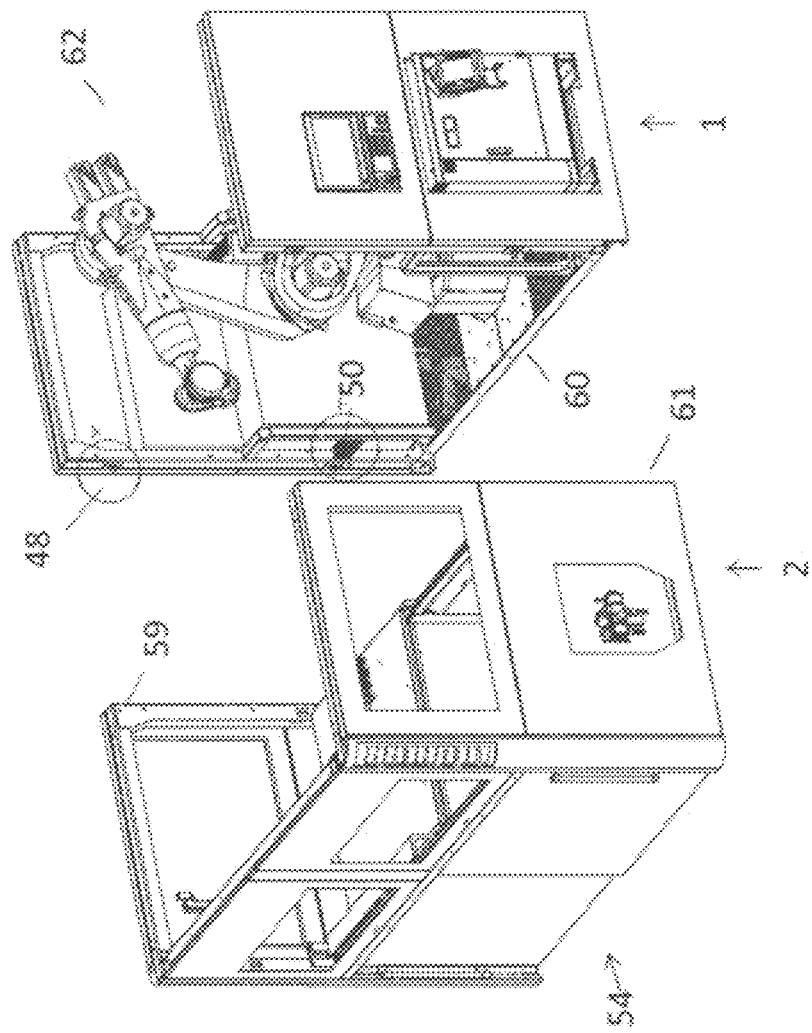
FIG. 14 shows the combination of the embodiment of a robot and/or handling module in accordance with the present disclosure shown in FIG. 11 with the feed module shown in FIG. 13.
Figure 15:
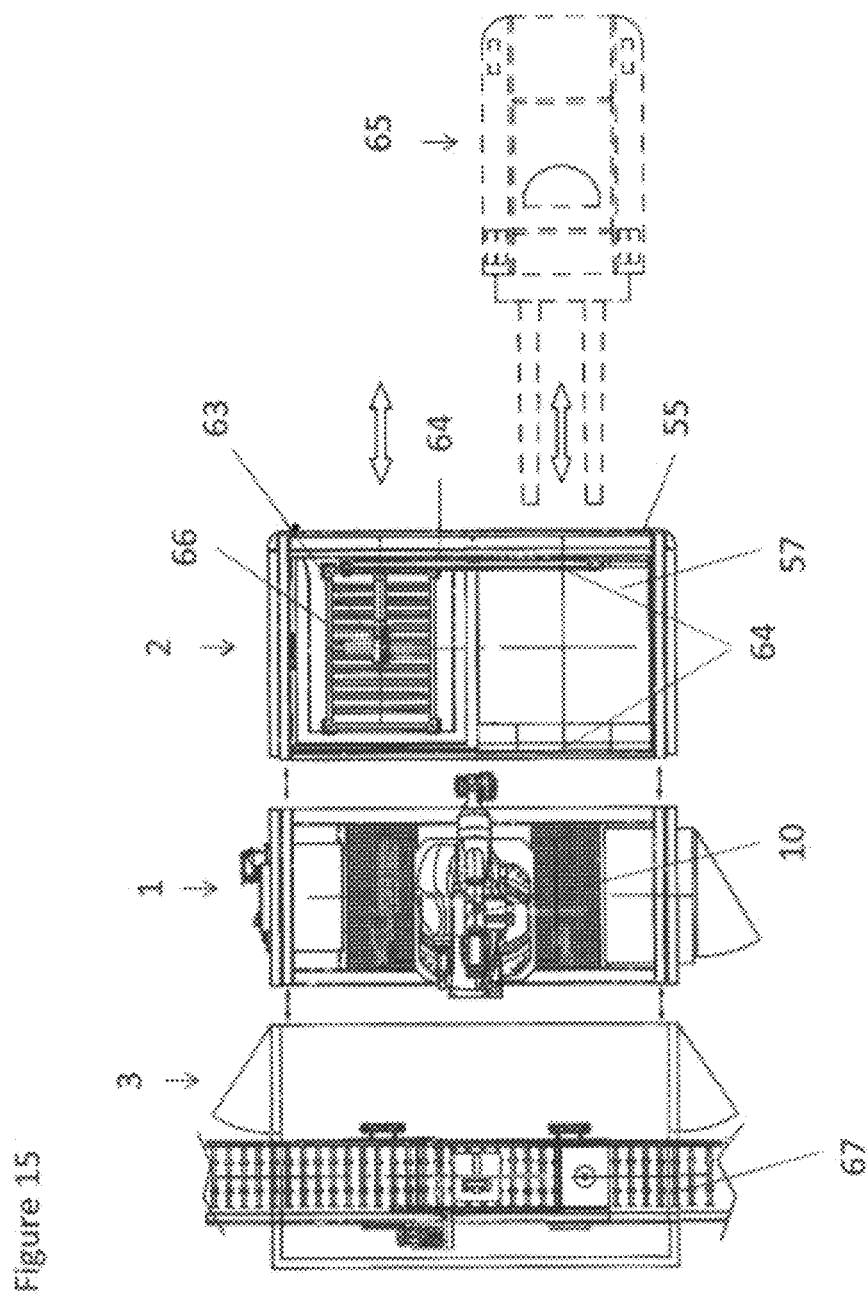
FIG. 15 shows a representation of an embodiment of an apparatus in accordance with the present disclosure for the automated removal of workpieces arranged in a container or of a combination in accordance with the present disclosure of a robot and/or handling module, of a feed module and of an output module.
Figure 16:
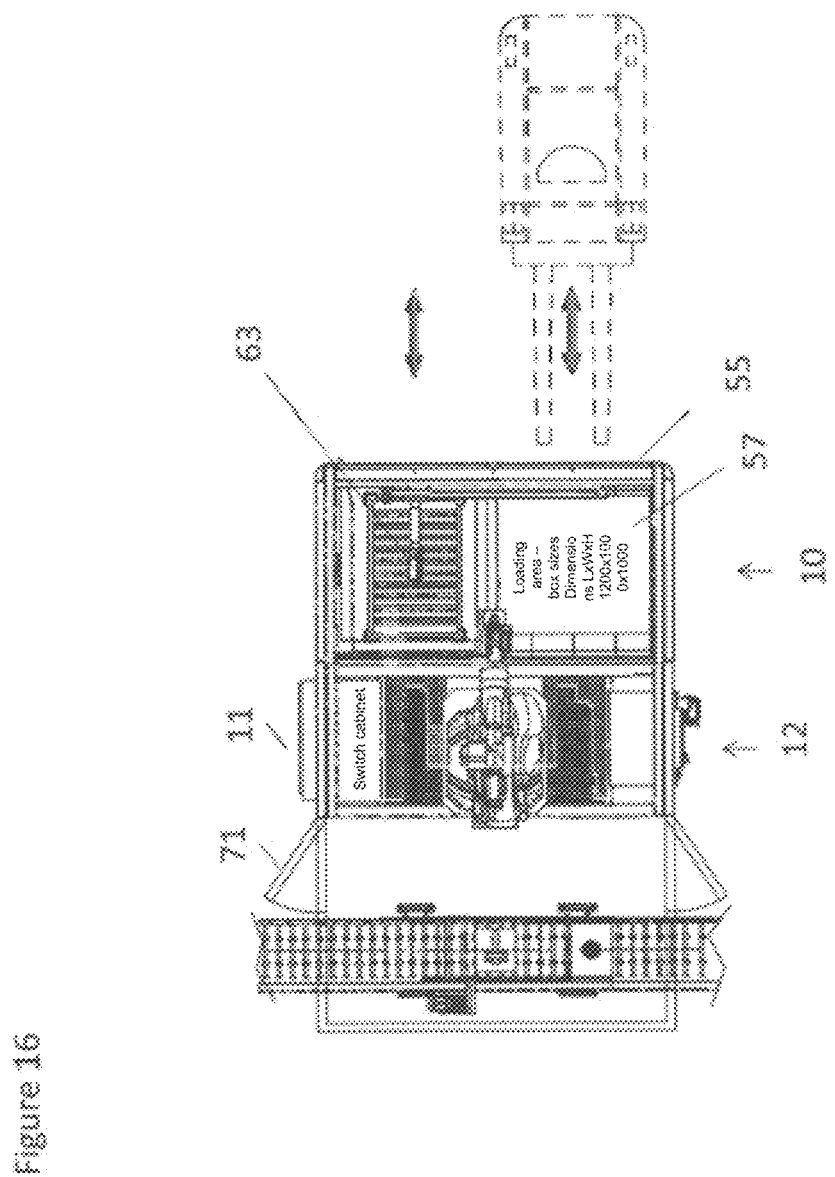
FIG. 16 shows the combination of modules shown in FIG. 15 in its assembled arrangement.

In FIGS. 14, 15 and 16, the combination of the handling module 1 and of the feed module 2 is now shown which together form an apparatus for the removal of workpieces from containers 66. The handling module 1 is in this respect furthermore connected at its free side disposed opposite the feed module to an output module 3 which will be looked at in more detail later.

The feed module in this respect forms a feed arrangement for the provision of containers from which the robot can remove workpieces which can also be used independently of the modular structure in accordance with the present disclosure. However, the above-described modular structure is particularly optionally provided here.

The feed arrangement formed by the feed module is in this respect accessible at a side for the provision and removal of containers. In the embodiment, sliding doors 55 are provided for this purpose which are let into the cell wall 54. Two feed zones provided next to one another in the feed arrangement are hereby accessible for a respective one container. The containers can in this respect be introduced into the feed arrangement via a fork lift 65 or can be removed therefrom after the emptying.

The provision of two containers in this respect has the advantage that after the emptying of a first container the apparatus can immediately start with the emptying of the second container without the removal operation having to be interrupted to replace the container. The empty container can rather be removed and can be replaced by a full container while the other container is emptied.

However, a separation of the feed zones for the containers from the working zone of the gripper with which the workpieces are removed from the container is required for this purpose. For this purpose, a displaceable hood 57 is provided which can be pushed either over the feed zone for the first container or over the feed zone for the second container and thus separates it from the working space of the gripper.

The doors 55 are in this respect optionally configured such that they can only be opened when the feed zone associated with the respective door is separated from the working zone of the gripper via the displaceable hood 47. It is hereby ensured that there is no risk of injury on the removal and setting of a container into the feed arrangement.

The apparatus in accordance with the present disclosure for the removal of workpieces from the containers in this respect has an object detection device having a sensor 63 which can be arranged above the respective container and which detects the workpieces in the container. It is in this respect in particular a 3D laser scanner. The data of the sensor arrangement are in this respect evaluated to identify the individual workpieces and their positions and to determine a workpiece suitable for gripping. A track planning for the gripper or for its gripper kinematics, in particular for the robot 10, then takes place using the positional data of this workpiece.

The sensor arrangement 63 is in this respect arranged travelable in the feed arrangement. A travel arrangement 64 is in particular provided for this purpose along which the sensor 63 can selectively be arranged above the first and second containers. This has the advantage, on the one hand, that only one sensor arrangement for detecting the workpieces has to be used since it can be traveled over the respective container in dependence on the container which is to be emptied. On the other hand, the sensor arrangement can be traveled away out of a region above the container after the workpieces have been detected so that the working zone of the gripper is not restricted by the sensor arrangement. After a workpiece has been removed, the sensor arrangement is then traveled back over the container to detect the remaining workpieces.

In the embodiment of the present disclosure, in which the total control electronics for the gripping from the container is arranged in the region of the robot module 1, the sensor arrangement 63 is connected to the control module of the robot module, with the data of the sensor module being evaluated via the control module.

The handling module is, as shown in FIGS. 15 and 16, connected to an output module on the open side disposed opposite the feed module. In the embodiment, it also has a cell frame which is connected to the cell frame of the handling module 1. The output unit in this respect has a transport path on which the gripper of the handling unit places down the workpieces removed from the container. The transport path is in this respect a roller belt. Nests into which the workpieces are placed can optionally be transported thereon. The cell frame of the output module also protects here against unauthorized access to the working zone of the robot 10. Doors 71 are provided for maintenance work via which the interior of the cell formed by the feed module, the handling module and the output module can be entered.

Due to the modular structure, the apparatus in accordance with the present disclosure for the removal of workpieces from a container can be used in a plurality of different areas with only small construction and assembly effort. The handling module in accordance with the present disclosure can in this respect in particular be combined with output units already present at the customer side so that only a corresponding connection of the handling module has to be designed from new, in particular via construction of a cell frame. The handling module can furthermore also optionally be combined with already present feed modules.

The robot module in accordance with the present disclosure can, however, also be used in other applications for a simple and inexpensive setup of a robot cell. It can in this respect in particular be combined with machining and/or assembly modules.

In one example, the various modules and/or interfaces may include control routines stored in memory of an electronic control system communicatively coupled with sensor, actuators, and/or displays for receiving data including input information, sensor information, and for sending actuator control and/or display information.

In one example, a robot module is provided, comprising: a cell frame and a robot, wherein the cell frame has a base plate on which the robot is mounted (with vertical being in the direction of the arrow shown in FIG. 14 above label 1) and has at least one cell wall connected to the base plate, and wherein the robot module is equipped with a control module for the robot. The cell frame may be comprised of planar walls with at least two side walls facing each other and parallel to one another but each perpendicular to the based plate, the walls at least as vertically tall as a lower motorized joint of the robot, the robot having at least a first and second motorized joining connected to one another. The planar walls may include an electronic display and user interface as well as a viewing window (as shown by the see-through cut-outs in FIG. 13). A feed module may also be provided also having a base plate and at least two planar side walls similar to the robot module. As the cell frame can have mechanical connection points for connection to further modules, each of the plurality of modules has common connecting points to provide modular connectivity. In this way, a system of modules may be provided, with each module in the system having common and complementary connection points in terms of physical location on the cell/walls as well as in terms of shape. Further, various methods of operation as described herein may be carried out by operating the robot in the cell in relative position to the one or more further modules, such as a feed module as illustrated in FIG. 14, where the robot is operated in coordination with other actuators such as those of the feed module.

FIGS. 11-16 are drawn approximately to scale, although other relative dimensions may be used, if desired.

The invention claimed is:

1. A robot module comprising:
   a cell frame and a robot, wherein the cell frame has a base plate on which the robot is mounted and has at least one cell wall connected to the base plate, wherein the robot module is equipped with a control module for the robot;
   at least one of an electrical supply, a pneumatic supply, and a hydraulic supply for providing at least one of hydraulic energy, electrical energy, and pneumatic energy to components of the robot module, and
   at least one of an electrical interface, a pneumatic interface, and a hydraulic interface for connection of at least one of a buffer module or a feeder module to the robot module such that the at least one of the buffer module or the feeder module can access the at least one of the electrical supply, the pneumatic supply, and the hydraulic supply of the robot module through the interface to be supplied with the at least one of the hydraulic energy, the electrical energy, and the pneumatic energy,
   wherein the cell frame has at least two cell walls at two sides and is open at two sides, and wherein the two cell walls are arranged at oppositely disposed sides of the base plate;
   wherein the cell walls protect a working zone of the robot module from unauthorized access;
   wherein the cell frame is connected to a second cell frame of a second module, wherein the second module is either the feeder module or the buffer module;
   wherein the robot module is a handling module, and wherein the robot is equipped with a gripper;
   wherein the control module has a control routine for instructing the gripper of the robot to grip workpieces via a first open side of the cell frame and to place down workpieces via a second open side of the cell frame;
   wherein the handling module grips workpieces arranged in an unordered manner in a container; and
   wherein the control module has an interface to an object recognition device for detecting the workpieces in the container.

2. The robot module in accordance with claim 1, wherein the cell frame has mechanical connection points for connection to further modules.

3. The robot module in accordance with claim 1, wherein the control module comprises instructions stored in memory for coordination of operation of the robot module with other modules via a control interface.

4. The robot module in accordance with claim 1, wherein the robot module has a control interface for a production control system, and wherein the control module includes instructions stored in memory for coordination of operation of the robot module with a further production system via the control interface for the production control system.

5. The robot module in accordance with claim 1, wherein the base plate of the cell frame has a rectangular shape and has a longer side and a shorter side.

6. The robot module in accordance with claim 1, wherein the cell frame has vertically extending corner struts, with the corner struts being connected via horizontally extending transverse struts to form cell walls, with mechanical connection points being provided at the corner struts for connection to at least the second module.

7. The robot module in accordance with claim 1, wherein at least two of the walls of the cell frame are connected to one another in an upper region via a transport strut.

8. The robot module in accordance with claim 1, further comprising an operating module which is arranged at an outer side of the cell wall, or a switch cabinet which is accessible from an outer side of the cell wall, or is equipped with a mobile hand-held operating unit.

9. The robot module in accordance with claim 1, wherein the cell frame is formed by perpendicularly positioned planar cell walls, and wherein the robot includes one or more motorized and electronically controlled joints with corresponding arms coupled thereto.

10. The robot module of claim 1, wherein the pneumatic supply comprises a compressed air generator or the hydraulic supply comprises a hydraulic high-pressure supply or the electrical supply is connectable to mains and supplies the components of the robot module with the electrical energy.

11. A buffer module comprising:
a cell frame;
a buffer station; and
at least one of an electrical interface, a pneumatic interface, and a hydraulic interface for connection to at least a first handling module having at least one of an electrical supply, a pneumatic supply, and a hydraulic supply,
wherein a robot of the handling module is equipped with a gripper;
wherein a control module has a control routine for instructing the gripper of the robot to grip the workpieces via a first open side of the cell frame and to place the workpieces down via a second open side of the cell frame;
wherein the buffer module can access the at least one of the electrical supply, the pneumatic supply, and the hydraulic supply of the at least the first handling module through the at least one of the electrical interface, the pneumatic interface, and the hydraulic interface to be supplied with at least one of hydraulic energy, electrical energy, and pneumatic energy,
wherein the cell frame has at least two cell walls at two sides and is open at two sides, and wherein the two cell walls are arranged at oppositely disposed sides of a base plate;
wherein the cell walls protect a working zone of the buffer module from unauthorized access; and
wherein the cell frame of the buffer module has a first and a second open side, wherein the first open side is connectable to an open side of a cell frame of the first handling module, such that a robot of the first handling module can place down workpieces on the buffer station, and wherein the second open side is connectable to an open side of a cell frame of a second handling module, such that a robot of the second handling module can pick up workpieces from the buffer station.

12. The buffer module according to claim 11, wherein the cell frame of the buffer module has mechanical connection points, wherein the buffer module has a control interface for a coordination of operation of the buffer module with other modules, or wherein the buffer module has a control interface for a production control system for a coordination of operation of the buffer module with a further production system.

13. A feed module comprising:
a cell frame;
an arrangement for providing at least one container having workpieces; and
at least one of an electrical interface, a pneumatic interface, and a hydraulic interface for connection to a robot module having at least one of an electrical supply, a pneumatic supply, and a hydraulic supply,
wherein the feed module accesses the at least one of the electrical supply, the pneumatic supply, and the hydraulic supply of the robot module through the at least one of the electrical interface, the pneumatic interface, and the hydraulic interface to be supplied with at least one of hydraulic energy, electrical energy, and pneumatic energy;
wherein the cell frame has at least two cell walls at two sides and is open at two sides, and wherein two of the at least two cell walls are arranged at oppositely disposed sides of a base plate;
wherein the cell walls protect a working zone of the feed module from unauthorized access;
wherein the cell frame is connected to a second cell frame of a second module, wherein the second module is either a handling module or a buffer module;
wherein a robot of the handling module is equipped with a gripper;
wherein a control module has a control routine for instructing the gripper of the robot to grip the workpieces via a first open side of the cell frame and to place the workpieces down via a second open side of the cell frame;
wherein the handling module grips workpieces arranged in an unordered manner in the container; and
wherein the control module has an interface to an object recognition device for detecting the workpieces in the container.

14. The feed module in accordance with claim 13, wherein the arrangement for providing at least one container having workpieces is arranged on the base plate, or wherein the workpieces are accessible from an outside via a door, a light barrier, an automatic container feed path, or a container removal path with this side being disposed opposite, or with at least one of the two open sides being a broad side of the feed module.

15. The feed module in accordance with claim 14, wherein the arrangement for providing the container having workpieces can receive at least two containers.

16. The feed module in accordance with claim 15, wherein the feed module has a separating apparatus via which a feed zone for the container can be separated from the working zone, with a hood being provided which is arranged in the feed module such that it can selectively cover the feed zone for any of the at least two containers.

17. The feed module in accordance with claim 15, wherein the feed module has a transport arrangement for transporting the container in an interior of the feed module, with the transport arrangement being able to cooperate with the automatic container feed path or the container removal path, or wherein the light barrier is provided which secures the feed zone.

* * * * *